Patented Oct. 18, 1932

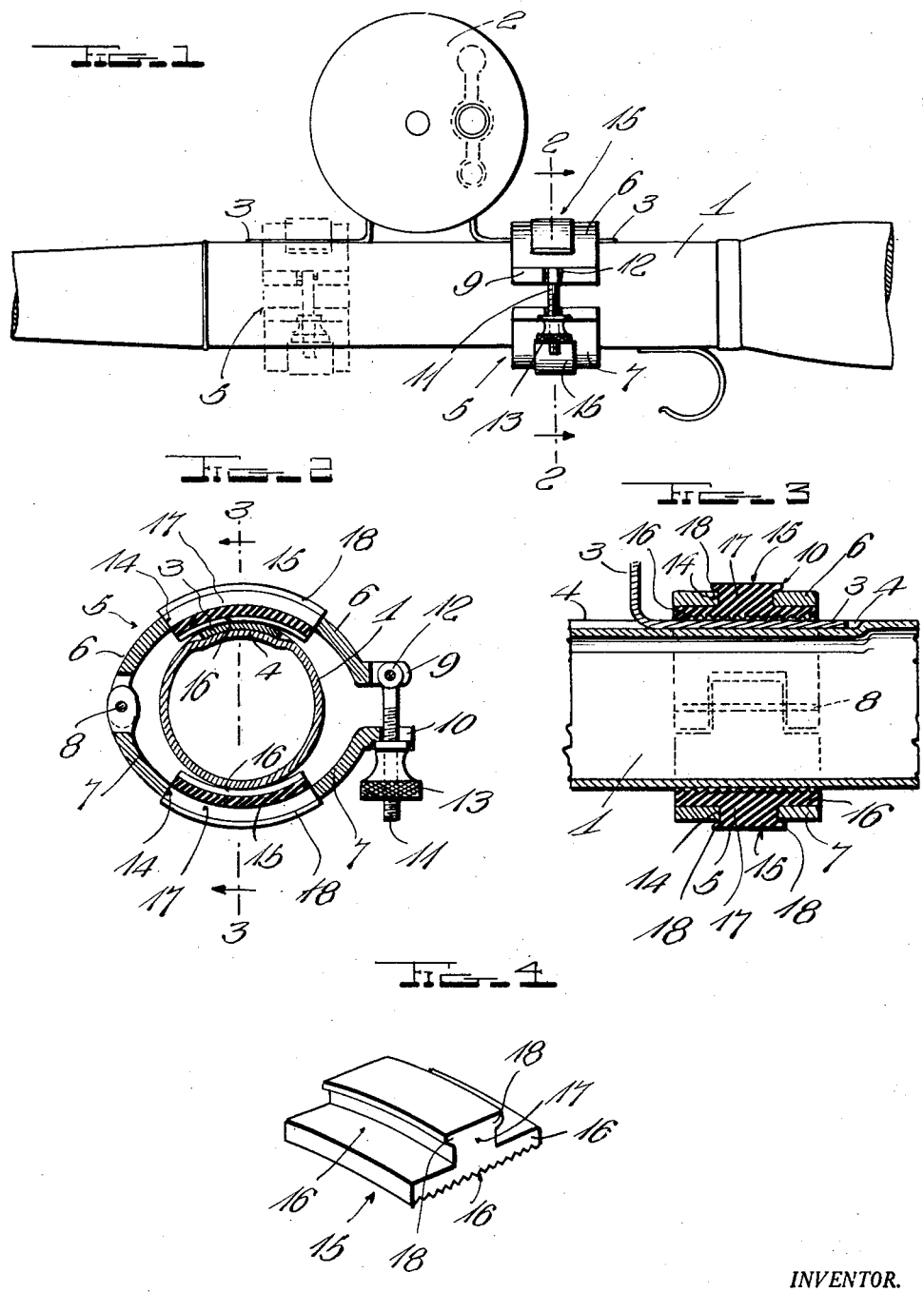

1,883,041

UNITED STATES PATENT OFFICE

EVERETT X. SOMERS, OF WEST BARNET, VERMONT

CLAMP

Application filed May 13, 1931. Serial No. 537,133.

My present invention pertains to clamps and it contemplates a simple and inexpensive device that is adapted primarily for securing in a movable yet rigid manner a reel to a fishing rod though it may be used as a hose clamp or for securing several conduits or the like together.

Other objects and advantages will be fully understood from the following description and claims when the same are read in connection with the drawing accompanying and forming part of this specification, in which Figure 1 is a view illustrating a fishing rod with a reel secured thereon by means of my novel clamp.

Figure 2 is a transverse sectional view taken in the plane indicated by the line 2—2 of Figure 1, looking in the direction of the arrow.

Figure 3 is a longitudinal sectional view taken in the plane indicated by line 3—3 of Figure 2 and looking in the direction of the arrow.

Figure 4 is a perspective view of one of my novel pads.

Similar numerals of reference designate corresponding parts in all the views of the drawing.

The ordinary well known fishing rod 1 is provided with longitudinal seats 4 into which legs 3 of the well known reel 2 rest.

As illustrated in Figure 1, I show one of my novel clamps 5 in full lines and one in dotted lines and the said clamps consist of the members 6 and 7 that are pivotally hinged at 8 and provided on the free ends of the members 6 and 7 are ears 9 and 10. A threaded screw or toggle bolt 11 is pivotally secured to the ear 9 and the ear 10 is provided with an open throat in which a portion of the screw or toggle bolt 11 rests when the knurled nut 13 is screwed home on the screw or toggle bolt 11.

Each of the members 6 and 7 is provided with elongated slots 14 that are adapted to receive the pads 15. The pads are one of the novel features of my device and they comprise the base portion 16 having corrugations on their inner faces that prevent slipping of the clamp on the rod or the article to which it is secured. These novel pads 16 are further provided with the integral web portions 17 that in turn are provided with ledges whereby when the pad is forced into the elongated slot, the web will engage the side walls of the slot and the outer portion of the web will lap over the side walls and the outer wall of the slot and clamp.

Manifestly this extreme novel construction will prevent casual displacement of the pads from the clamp.

Attention is particularly directed to the fact that the screw or toggle bolt is of sufficient length so as to make the clamp conform to various sizes of rods and reels or in the case of hose connections, various sizes of hose and at the same time the knurled nut will facilitate the clamping of members 6 and 7 about the element to which it is to be secured.

What I claim is:—

1. A clamp comprising two hinged members, ears formed on one of said members, a toggle-bolt hinged in said ears, a throat arranged on one of said members and adapted to receive the toggle bolt, whereby the free ends of said members are secured to each other and pads adapted to be mounted on the body portion of the members; said members being provided with elongated slots and said pads comprising an upper face adapted to rest in the slots and a corrugated free face.

2. A clamp comprising two members hinged to each other at one end thereof and having elongated slots therein, means removably securing the free ends of the members to each other and pads adapted to rest in and be engaged by the slots of the members; said pads comprising a ledge portion and a free portion having corrugations therein.

3. In means for the purpose set forth, the combination of two semi-circular hinged portions each of which are provided with elongated slots, a toggle-bolt arranged on one end of one of the portions and a throat formed in the free end of the other of the portions whereby the toggle-bolt of one portion may enter the throat of the other portion and a knurled nut threaded on the toggle-bolt and adapted to bear on a surface of one of the portions whereby the two semi-circular portions are removably secured to each other and rubber pads having ledges formed on one face thereof; said ledges being adapted to seat in the slots of the semi-circular portions and corrugations formed in the free faces of the pads.

In testimony whereof I have hereunto set my hand.

EVERETT X. SOMERS.